United States Patent [19]

Takahashi

[11] E Patent Number: Re. 32,996

[45] Reissued Date of Patent: Jul. 25, 1989

[54] CONTINUOUS DELIVERY APPARATUS FOR WORK MATERIAL

[76] Inventor: Kentaro Takahashi, 131, Dainichi, Yotsukaido-shi, Chiba, Japan

[21] Appl. No.: 132,210

[22] Filed: Dec. 14, 1987

Related U.S. Patent Documents

Reissue of:

[64] Patent No.: 4,582,271
Issued: Apr. 15, 1986
Appl. No.: 518,235
Filed: Jul. 28, 1983

[30] Foreign Application Priority Data

Dec. 28, 1982 [JP] Japan ..... 57-202403
Dec. 28, 1982 [JP] Japan ..... 57-202404

[51] Int. Cl.[4] ..... B65H 23/185; B65H 59/38

[52] U.S. Cl. ..... 242/55; 242/45; 242/75.51; 242/78.6; 242/105

[58] Field of Search ..... 242/55, 54 R, 75.51, 242/75, 45, 78.6, 105, 186, 189, 190

[56] References Cited

U.S. PATENT DOCUMENTS

| | | | |
|---|---|---|---|
| 1,265,329 | 5/1918 | Henderson | 242/75.5 |
| 1,455,976 | 5/1923 | Stevens | 242/75.5 X |
| 2,097,142 | 10/1937 | Borton | 242/75.5 |
| 2,167,549 | 7/1939 | Hudson | 242/75.5 X |
| 2,760,734 | 8/1956 | Hornberger | 242/75.5 |
| 3,137,452 | 6/1964 | Winders | 242/45 X |
| 3,162,394 | 12/1964 | Culpepper et al. | 242/105 X |
| 3,381,913 | 5/1968 | Bachman | 242/78.6 |
| 3,476,330 | 11/1969 | Curtland | 242/45 |
| 3,544,029 | 12/1970 | Meier | 242/78.6 |
| 3,575,358 | 4/1971 | Manner | 242/105 |
| 3,807,613 | 4/1974 | Holm | 226/42 |
| 3,807,615 | 4/1974 | Crocker . | |
| 4,009,674 | 3/1977 | Ladd | 242/75.51 X |
| 4,169,566 | 10/1979 | Boudouris et al. | 242/75.51 X |
| 4,249,705 | 2/1981 | Brooks et al. | 242/78.6 |
| 4,269,369 | 5/1981 | Stroup | 242/78.6 X |
| 4,290,561 | 9/1981 | Satzinger | 242/78.6 X |
| 4,290,563 | 9/1981 | Brooks et al. | 242/78.6 |
| 4,304,370 | 12/1981 | Box et al. | 242/78.6 |

FOREIGN PATENT DOCUMENTS

| | | |
|---|---|---|
| 55-17653 | 5/1980 | Japan . |
| 56-169913 | 12/1981 | Japan . |

*Primary Examiner*—Stanley N. Gilreath
*Attorney, Agent, or Firm*—Fishman, Dionne & Cantor

[57] ABSTRACT

A continuous delivery apparatus for continuously feeding a lengthy work material wound into an approximately ring-like form to a press or the like. This apparatus comprises a rotatable turn-table on which wound material is placed so that an axis of the material is crossed perpendicular to the turn-table, a motor for rotating and driving the turn-table, and a swing arm, one end of which is supported on a rotating shaft whereas the other end thereof is pivotable from a center of the wound work material to an outer peripheral direction, said swing arm being always biased in an outer peripheral direction. The swing arm which is pivotally moved with a change in wound amount of work material is removed as an amount of rotation of the rotating shaft, said amount of rotation controlling the rotational speed of a motor to deliver work material at a constant speed at all times.

23 Claims, 2 Drawing Sheets

CONTINUOUS DELIVERY APPARATUS FOR WORK MATERIAL

Matter enclosed in heavy brackets [ ] appears in the original patent but forms no part of this reissue specification; matter printed in italics indicates the additions made by reissue.

FIELD AND BACKGROUND OF THE INVENTION

The present invention relates to a continuous delivery apparatus for continuously feeding a lengthy work material, which is wound into an approximately ring-like form, to a working machine, and more specifically, to a continuous delivery apparatus for work material which can alway feed a given amount of work material to the working machine even if a wound diameter thereof is varied.

Where a strip-like or linear lengthy work material is subjected to working by a working machine such as a press, the working machine has a function to draw the work material through a predetermined length in addition to a working function such as pressing and cutting. Thus, the work material is wound into an approximately ring-like form, which is placed on a turn-table so that an axis of material is crossed perpendicular to the turn-table, and the material is delivered while unwinding the work material by rotation of the turn-table. In the past, there has been proposed a delivery apparatus of this kind which is designed so that a motor for rotating and driving the turn-table is actuated intermittently through a limit switch or the like, and intermittent rotation of the turn-table delivers work material on the turn-table to the press or the like. However, in the delivery apparatus just mentioned, the amount of intermittent rotation of the turn-table is always constant, whereas the wound work material decreases its length to be delivered as a diameter thereof decreases and therefore, work material of suitable length cannot be fed by the working machine. In the circumstances, it is considered that the amount of delivery of work material is indexed from the diameter of a portion near the end of work material and the amount of rotation of the turn-table at that time is set. However, with this amount of rotation, when the work material begins to be used, that is when the diameter of the wound work material is large, work material more than as needed becomes delivered and as the result, a slackness occurs between the delivery apparatus and the working machine.

SUMMARY OF THE INVENTION

It is an object of the present invention to provide a continuous delivery apparatus for work material which can continuously deliver work material at a constant speed at all times in accordance with the amount necessary for the working machine irrespective of change in diameter of wound work material.

In accordance with the present invention, there is provided a continuous delivery apparatus for work material for continuously delivering a wound work material to a working machine, comprising a rotating support device comprising a rotatable turn-table on which the wound work material is placed so that an axis of said material is crossed perpendicular to said turn-table and a motor for rotating and driving said turn-table; and a control device comprising a detecting member positioned above the turn-table, said detecting member having a portion supported for reciprocating movement on the work material, a biasing device for always biasing said detecting member in one direction and a speed setting device associated with operation of said detecting member to set rotating speed of the motor.

In accordance with a preferred embodiment of the present invention, the detecting member of the control device comprises a swing arm, one end of which is supported on a rotating shaft whereas the other end which can be swung in a generally radial direction [from] *between* the center of wound material [toward] *and* the outer periphery thereof, and the biasing member comprises a weight for always biasing the said swing arm. The speed setting device comprises a rotary type variable resistor, a rotating shaft of which is associated with a rotating shaft of the swing arm. The variable resistor is so set that rotation of the motor increases as the other end of the swing arm is moved towards the center of the wound work material. Accordingly, it may be designed that when the wound amount of work material is large, the turn-table is slowly rotated while as the wound amount thereof decreases, the turn-table is rotated gradually quickly, whereby the work material can be always delivered at a contstant speed in accordance with amount necessary for the working machine.

DESCRIPTION OF THE PREFERRED EMBODIMENTS

Figure 1:
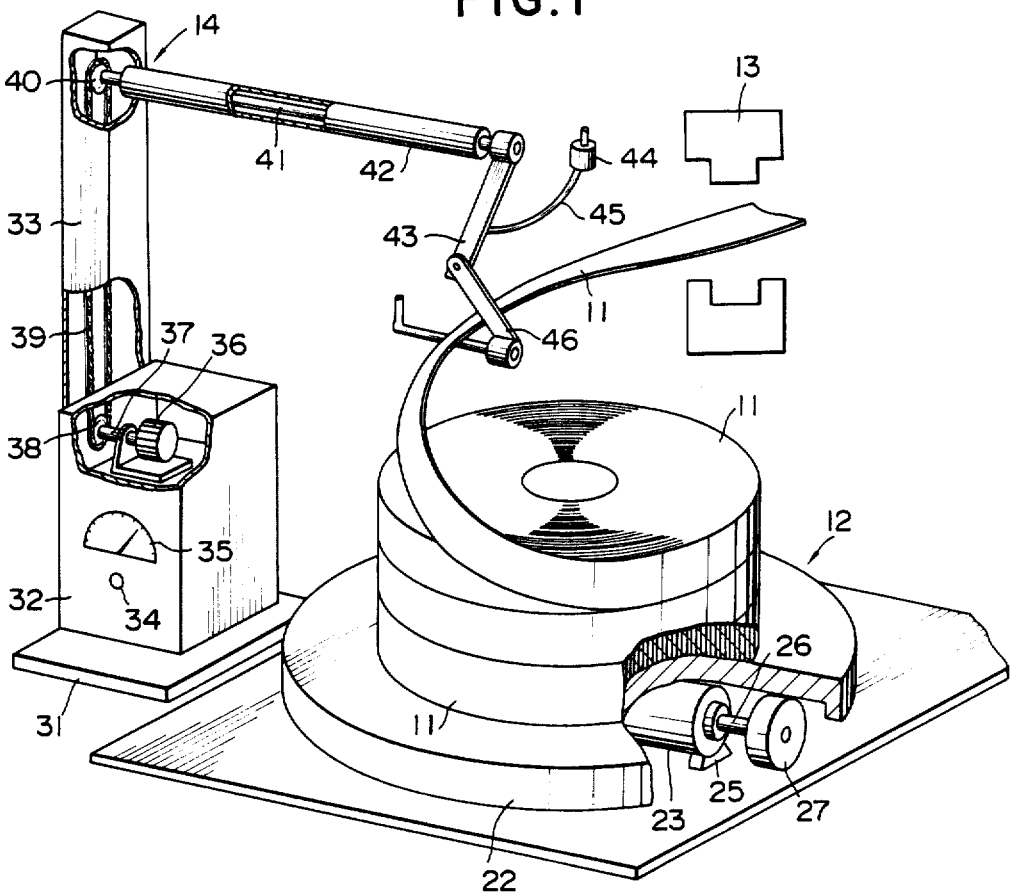
FIG. 1 is a perspective view partly in section showing one embodiment of the continuous delivery apparatus in accordance with the present invention.

Referring to FIG. 1, there is shown one embodiment of the continuous delivery apparatus of the present invention. This continuous delivery apparatus comprises a rotating support device 12 for placing a wound work material 11 thereon, and a control device 14 for guiding the work material 11 to a working machine such as a press 13 and detecting the amount of the work material 11 on the rotating support device 12 to control rotational speed. While there is shown in FIG. 1 the work material 11 in which a strip-like thin plate member is wound into an approximately dough nut form, it should be noted that the work material is not limited thereto but a work material in which for example, a linear member of circular section is wound into a core can be used.

Figure 2:
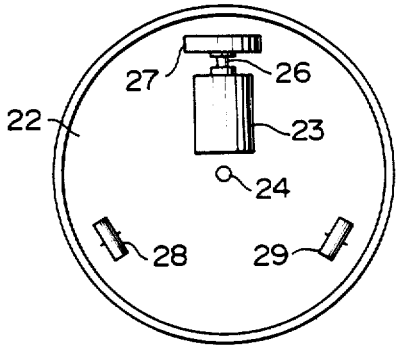
FIG. 2 is a bottom view showing the supporting state of a turn-table of FIG. 1.

The rotating support device 12 has a turn-table 22 rotatably supported on a base 21 and a motor 23 for rotating and driving the turn-table 22. The turn-table 22 is mounted on the upper end of a center shaft 24 one end of which is rotatably supported on the base 21 so that the center of the turn-table is positioned at said upper end. It is of course possible that the center shaft 24 can be made stationary and the turn-table 22 is rotatably mounted on the shaft 24. The motor 23 is mounted on the base 21 on the lower surface of the turn-table 22 through a spacer 25. The motor 23 is mounted so that a driving shaft 26 thereof is positioned parallel to surfaces of the base 21 and turn-table 22, respectively. On the extreme end of the driving shaft 26 is mounted a driving roller 27 so that a peripheral surface thereof comes into contact with the lower surface of the turn-table 22 to rotate the latter. The driving roller 27 is made free from contact with the base 21 by the provision of the spacer 25. As shown in FIG. 2, driven rollers 28 and 29 for rotatably supporting the turn-table 22 are rotatably mounted on the base 21 on the lower surface of the turn-table, and the turn-table 22 is rotatably supported at three points, that is the driving roller 27 and two driven rollers 28 and 29.

The control device 14 has a box body 32 installed on the base 31 and a hollow vertical support 33 one end of which is mounted on the side of said box body 32. On the box body 32 are mounted a power supply switch 34 for turning ON and OFF the motor 23 and a meter 35 which displays the voltage value supplied to the motor 23 or the rotational speed of the motor 23. The box body 23 is interiorly provided with a rotary type variable resistor 36 which regulates a power supply voltage to the motor 23 to control the rotational speed of the turn-table 22. The variable resistor 36 has an input terminal connected to the power supply switch 34 and an output terminal connected to an input terminal of the motor 23. A rotating shaft 37 of the variable resistor 36 is mounted so as to be positioned horizontally to the base 31 and the extreme end of the rotating shaft 37 is positioned within the vertical column 33. A sprocket 38 is mounted on the extreme end of the rotating shaft 37. An endless chain 39 engages the sprocket 38, and a sprocket 40 provided within the upper end of the vertical column 33 engages the other end of the endless chain 39. The sprocket 40 is mounted on one end of a support shaft 41 which extends parallel to the rotating shaft 37. The support shaft 41 is rotatably inserted into a sleeve 42 one end of which is supported on the vertical column 33, and one end of a swing arm 43 is mounted on the other end of the support shaft 41 extending from the other end of the sleeve 42. On the swing arm 43 is mounted a weight 44 through a support member 45 to apply a load in a way that the arm 43 may be always rotated clockwise in FIG. 1. One end of a guide rod 46 in the shape of approximately a hook is pivotably mounted on the other end of the swing arm 43, and work material is extended over the horizontal portion of the guide rod 46.

Figure 3:
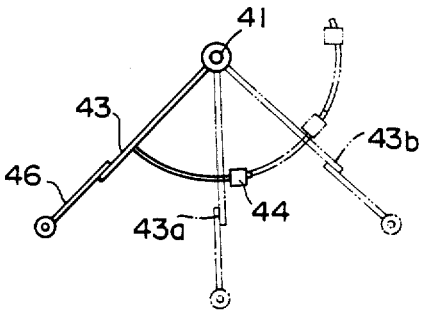
FIG. 3 is a view for explanation of operation of a guide arm in FIG. 1.

To deliver the work material to the press 13 by the above described continuous delivery apparatus, the wound work material is placed on the turn-table 22 so that the axis of the wound work material is made vertical, and the outer end of the material unwound is engaged with the horizontal portion of the guide rod 46. At this time, the guide rod 46 is suitably bent with respect to the swing arm 43 to preset the optimum engaging condition of the work material 11. The work material engaged with the horizontal portion of the guide rod 46 is guided into the press 13 preset so as to draw work material at a constant speed. Thereby, the swing arm 43 having been pivotally moved clockwise by the weight is pivotally moved counterclockwise as shown at 43a of FIG. 3. The position of the control device 14 relative to rotating support device 12 is set so that the position of the swing arm 43 may assume a position where the work material 11 begins to be used as shown in FIG. 1. By pivotal movement of the swing arm 43, the support shaft 41 also rotates counterclockwise to rotate counterclockwise the rotating shaft 37 of the variable resistor 36 through the sprocket 40, the endless chain 39 and the sprocket 38. At this time, however, the value of the variable resistor 36 is set so that the motor 23 is driven to deliver the work material 11 from the turn-table 22 substantially in coincidence with the drawing speed of the work material of the press 13.

Next, when the power supply switch 34 of the motor 23 is turned ON, the motor 23 runs and the turn-table 24 is rotated at a constant speed by the driving roller 27. With this rotation, the work material 11 is delivered, while being unwound, to the press 13. Since at the beginning, the wound diameter of the work material is large, even if the rotation of the turn-table 22 is slow, the work material can be unwound in accordance with the amount required by the press 13. As the wound diameter of the work material decreases, the swing arm 43 is pivotally moved counterclockwise and in a generally radial direction from the [center] *outer periphery* of the wound material toward the [outer periphery] *center* thereof by the work material 11 as shown at 43b of FIG. 3. By this pivotal movement, the support shaft 41 is rotated, and this rotation is transmitted to the rotating shaft 37 of the variable resistor 36 to vary the resistance. In this case, if the diameter of the sprocket 38 is made smaller than that of the sprocket 40, even slight rotation of the support shaft 41 can be transmitted to the rotating shaft 37 with accuracy. If at this time, setting is made so that the resistance of the variable resistor 36 is gradually decreased, the power supply voltage of the motor 23 increases whereby the rotation of the turn-table 23 gradually increases. Thus, the work material 11 unwound from the turn-table 22 becomes fixed. Where wound work materials 11 are stacked in a multi-layered fashion as shown in FIG. 1, when the uppermost work material is finished, the next layer of work material can be engaged with the horizontal portion of the guide rod 46 in a manner similar to that as previously mentioned. Simultaneously with the termination of the uppermost work material, the swing arm 43 is returned to the position as indicated by the solid line of FIG. 3 by the weight 44, and therefore, the resistance of the variable resistor 36 also assumes its original value.

Figure 4:
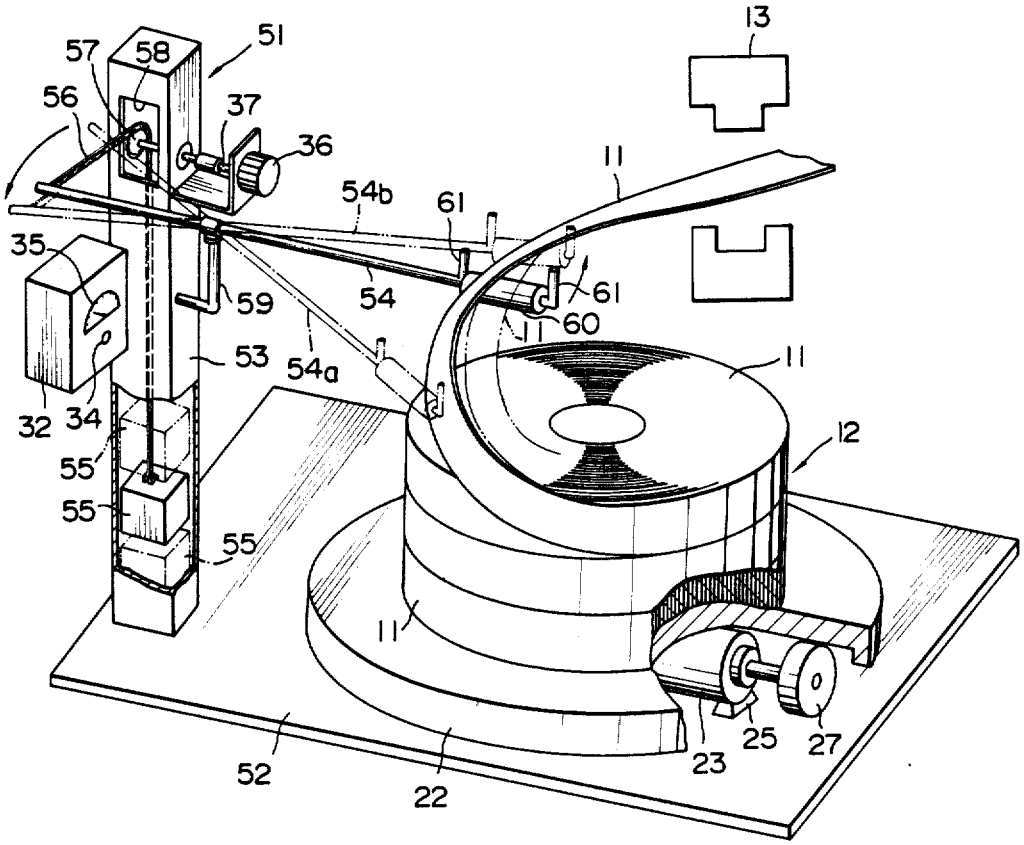
FIG. 4 is a perspective view partly in section showing a further embodiment of the continuous delivery apparatus in accordance with the present invention.

A second embodiment of the present invention shown in FIG. 4 provides an arrangement wherein pivotal movement of the swing arm is directly detected to control the motor. In this embodiment, elements similar to those of the above described first embodiment bear like reference numerals and the detailed description will not be made. In this embodiment, a control device 51 is secured onto a base 52 which is the same as the rotating support device 12. The control device 51 has a hollow vertical column 53 and a swing arm 54, an intermediate portion of which is pivotably mounted on the column 53. The vertical column 53 is interiorly provided with a weight 55 which can be moved up and down, and one end of a chain belt 56 is mounted on the weight 55. The chain belt 56 engages a sprocket 57 positioned at an upper portion within the vertical column 53, and the other end thereof extends outside from a side opening 58 of the column 53. The sprocket 57 is mounted on the extreme end which extends into the column 53 of the rotating shaft 37 of the variable resistor 36 mounted on the front surface of the vertical column 53. The swing arm 54 has a portion mounted pivotably in a horizontal direction on the other end of a support arm 59 one end of which is mounted on the vertical column 53. A guide roller 60 and a guide projection 61 for the work material 11 are provided on the extreme end of the swing arm 54, and the other end of the swing arm 54 is positioned at a side opening 58 of the column 53 and the other end of the chain belt 56 is mounted thereon.

The swing arm 54 remains positioned as shown at 54a by the action of the weight 55 unless the work material 11 is placed in engagement with the guide roller 60 at the extreme end of the swing arm 54. By guiding the work material 11 to the press 13 from the guide roller 60, the swing arm 54 is positioned as shown by the solid line by tension of the work material 11 which lifts the weight 55, against the weight of the weight 55. As the wound work material 11 is successively delivered and the wound diameter of the work material 11 is decreased, the swing arm 54 is pivotally moved counterclockwise, and the chain belt 56 is also drawn from the side opening 58 accordingly. By this movement of the chain belt 56, the resistance of the variable resistor 36 varies.

Figure 5:
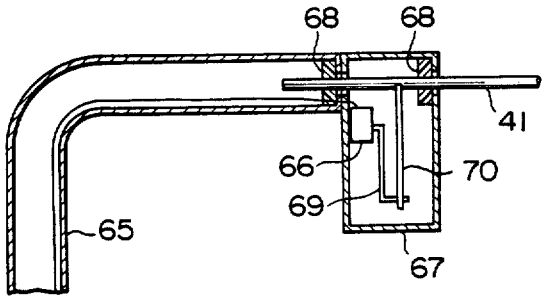
FIG. 5 is a sectional view showing another embodiment of a rotating detection mechanism of a supporting shaft.

FIG. 5 shows another embodiment of a mechanism for detecting rotation of the support shaft 41 in the first embodiment. In this embodiment, a hollow column 65, upper portion of which is bended substantially horizontally, is provided in place of the vertial column 33, and a casing 67 for housing the variable resistor 66 is mounted on the extreme end of the column 65. The rear end of the support shaft 41 extends into the extreme end of the column 65 from said casing 67 and is rotatably supported by means of a bearing 68. A rotating shaft 69 of the variable resistor 66 is bended into a crank-like form, forward end of which is mounted to be positioned downwardly. To the support shaft 41 positioned within the casing 67 are secured upper ends of two arms 70 so as to nip the support shaft 41 therebetween. A lower end of a rotating shaft 69 is positioned at the lower end of two arms 70 so as to be loosely fitted into a gap between the arms 70. In this embodiment, when the support shaft 41 is rotated as the diameter of work material 11 varies as in the above described first embodiment, this rotation is converted into pivotal movement by means of the arms 70. By pivotal movement of the arms 70, the rotating shaft 69 of the variable resistor 60 loosely fitted between these arms 70 is also rotated whereby the resistance of the variable resistor 66 can be varied. Since the rotating shaft 69 is positioned at the lower end of the arms 70, even slight rotation of the support shaft 41 is turned into great pivotal motion at the lower end of the arms 70 to provide accurate association with the variable resistor 66.

While in the first and second embodiments, rotation of the rotating shaft of the variable resistor is controlled by the chain belt and the sprocket, an assembly of a friction belt and pulleys can be used instead. Alternatively, in the first embodiment, the rotating shaft of the variable resistor can be mounted directly on the support shaft.

What is claimed is:

1. A continuous delivery apparatus for work material for continuously delivering a wound work material to a working machine, comprising a rotating support device comprising a rotatable turn-table on which the wound work material is placed so that an axis of said material is vertically disposed and perpendicular to said turn-table and a motor for rotating and driving said turn-table; and a control device comprising a detecting member positioned above the turn-table, means supporting a portion of said detecting member for movement above and in a generally radial direction from the center of the wound work material toward the outer periphery thereof, said portion being engaged with the outer end of the wound work material so that said end is pulled across the wound work material in a radial direction thereof, a biasing device for continuously biasing said portions of said detecting member in said generally radial direction from the center of the wound work material toward the outer periphery thereof; and a speed setting device for setting the rotating speed of the motor in response to movement of said supporting portion.

2. A continuous delivery apparatus according to claim 1, wherein said detecting member comprises a swing arm, one end of which carries said portion and which is pivotally moved up and down relative to said wound work material, and a rotating shaft which is mounted on the other end of said swing arm and rotated by pivotal movement of said swing arm, said speed setting device being actuated in response to the rotation of said rotating shaft.

3. A continuous delivery apparatus according to claim 1, wherein said detecting member comprises a swing member, one end of which defines said portion and which is horizontally pivotally moved on said wound work material, and a conversion member mounted on the other end of said swing member to convert the pivotal movement of said swing member into rotational movement, said speed setting device being actuated by the rotation of said conversion member.

4. A continuous delivery apparatus according to claim 2, wherein said speed setting device comprises a rotary type variable resistor having a rotatable shaft, sprockets mounted on said rotating shaft and the rotatable shaft of said variable resistor, and an endless chain belt stretched over said two sprockets.

5. A continuous delivery apparatus according to claim 3, wherein said conversion member comprises a chain belt, one end of which is mounted on said other end of said swing member and the other end of which is mounted vertically movably up and down relative to said work material, and a sprocket engaging said chain belt.

*6. Apparatus for delivering a wound work material to a work machine, the apparatus including:*

*rotatable table means on which the wound work material is intended to be placed, with an axis of the wound work material to be vertically disposed and perpendicular to the table means, said table means being in a generally horizontal plane;*

*variable speed motor means for rotating said rotatable table;*

*work engaging means supported at an elevated location with respect to said table means and being adapted for engagement by the work material at a location higher than the wound work material on said table when the work material is drawn toward the work machine, said work engaging means being movable above the plane of said table means in a generally vertical arc of movement in response to forces imposed directly on said work engaging means by an open loop of the work material passing over said work engaging means;*

*means for biasing said work engaging means toward a first position, said work engaging means being progressively moved by the engaged work material from*

*said first position toward a second position as the amount of wound work material on said table decreases; and* speed control means responsive to the movement of said work engaging means to vary the speed of rotation of said table means in response to movement of said work engaging means in accordance with changes in diameter of the wound work material.

*7. Delivery apparatus as in claim 6 including:*

*swing arm means connected to said work engaging means, and horizontally disposed rotatable support means to which said swing arm means is connected;*

*said rotatable support means and said swing arm means being moved in response to movement of said work engaging means whereby said rotatable support means is rotated in a predetermined direction in response to the decrease in the amount of wound work material on said rotatable table means; and*

*said rotatable support means being operatively connected to said speed control means.*

*8. The delivery apparatus of claim 7 wherein:*

*said swing arm means is disposed in a generally vertical plane with respect to the plane of said rotatable table means.*

*9. The delivery apparatus of claim 8 wherein:*

*said swing arm means is movable in said generally vertical plane.*

*10. The delivery apparatus of claim 6 wherein:*

*the speed of said motor means is varied as a function of the amount of work material remaining on the work table.*

*11. Apparatus for delivering a wound work material to a work machine, the apparatus including:*

*rotatable table means on which the wound work material is intended to be placed, said table means being in a generally horizontal plane;*

*variable speed motor means for rotating said rotatable table;*

*work engaging means supported at an elevated location with respect to said table means and being adapted for engagement by the work material at a location higher than the wound work material on said table when the work material is drawn toward the work machine, said work engaging means being movable above the plane of said table means in response to forces imposed directly on said work engaging means by an open loop of the work material;*

*means for biasing said work engaging means toward a first position, said work engaging means being progressively moved by the engaged work material from said first position toward a second position as the amount of wound work material on said table decreases; and*

*speed control means responsive to the movement of said work engaging means to vary the speed of rotation of said table means in response to movement of said work engaging means in accordance with changes in diameter of the wound work material.*

*12. Delivery apparatus as in claim 11 wherein said work engaging means includes:*

*swing arm means, and horizontally disposed rotatable support means coupled to said swing arm means;*

*said rotatable support means and said swing arm means being moved in response to movement of said work engaging means whereby said rotatable support means is rotated in a predetermined direction in response to the decrease in the amount of wound work material on said rotatable table means; and*

*said rotatable support means being operatively connected to said speed control means.*

*13. The delivery apparatus of claim 12 wherein:*

*said swing arm means is disposed in a generally vertical plane with respect to the plane of said rotatable table means.*

*14. The delivery apparatus of claim 13 wherein:*

*said swing arm means is movable in said generally vertical plane.*

*15. The delivery apparatus of claim 11 wherein:*

*the speed of said motor means is varied as a function of the amount of work material remaining on the work table.*

*16. An apparatus for delivering a wound work material to a work machine at a constant material delivery speed, comprising:*

*generally horizontal rotatable table means for rotating a wound work material placed thereon;*

*variable speed motor means coupled to said rotatable table means for driving said rotatable table means at variable speed;*

*movable work material supporting means disposed at an elevated location with respect to said rotatable table means for movably supporting a part of the work material as the work material is unwound and drawn toward the work machine, means for biasing said supporting means toward a first position relative to said table means said supporting means being moved toward a second position relative to said table means in response to forces imposed directly on said supporting means by an open loop of the work material to generate a rotating signal; and*

*control means coupled to said movable work material supporting means for controlling said variable speed motor means in response to said rotary signal of said movable work material supporting means to progressively increase rotation speed of said rotatable table means as a diameter of the wound work material remaining on said rotatable table means decreases.*

*17. The apparatus of claim 16, wherein said movable work material supporting means comprises:*

*rotatable rod means extending over said rotatable table means;*

*swing arm means, swingably coupled to said rotatable rod means, for swingably supporting the unwound work material; and*

*said biasing means being swing arm biasing means coupled to said swing arm means for biasing said swing arm means toward said first position, said swing arm means being progressively moved by the work material from said first position toward said second position as the amount of the wound work material remaining on said rotatable table means decreases.*

*18. The apparatus as set forth in claim 17, wherein said control means comprises:*

*angular position detecting means, coupled to said rotatable rod means, for detecting angular positions of said rotatable rod means rotated when said swing arm means is progressively moved by the wound work material from said first position toward said second position; and*

*motor speed control means, coupled to said angular position detecting means, for controlling said variable speed motor means in response to detected angular positions of said rotatable rod means.*

*19. A continuous delivery apparatus for work material for continuously delivering a wound work material to a working machine, comprising a rotating support device comprising a rotatable turn-table on which the wound work material is placed so that an axis of said material is vertically disposed and perpendicular to said turn-table and a motor for rotating and driving said turn-table; and a control device comprising a detecting member positioned above the turn-table, means supporting a portion of said detecting member for movement above and in a generally radial direction between the center of the wound work material and the outer periphery thereof, a biasing device for continuously biasing said portions of said detecting member in said generally radial direction from the center of the wound work material toward the outer periphery thereof; said portion of said detecting member being engaged with the outer end of the wound work material so that said end is pulled across the wound work material to move said detecting member in a generally radial direction from the outer periphery of the work material toward the center thereof; and a speed setting device for setting the rotating speed of the motor in response to movement of said supporting portion.*

*20. A continuous delivery apparatus according to claim 19, wherein said detecting member comprises a swing arm, one end of which carries said portion and which is pivotally moved up and down relative to said wound work material, and a rotating shaft which is mounted on the other end of said swing arm and rotated by pivotal movement of said swing arm, said speed setting device being actuated in response to the rotation of said rotating shaft.*

*21. A continuous delivery apparatus according to claim 19, wherein said detecting member comprises a swing member, one end of which defines said portion and which is horizontally pivotally moved on said wound work material, and a conversion member mounted on the other end of said swing member to convert the pivotal movement of said swing member into rotational movement, said speed setting device being actuated by the rotation of said conversion member.*

*22. A continuous delivery apparatus according to claim 20, wherein said speed setting device comprises a rotary type variable resistor having a rotatable shaft, sprockets mounted on said rotating shaft and the rotatable shaft of said variable resistor, and an endless chain belt stretched over said two sprockets.*

*23. A continuous delivery apparatus according to claim 21, wherein said conversion member comprises a chain belt, one end of which is mounted on said other end of said swing member and the other end of which is mounted vertically movably up and down relative to said work material, and a sprocket engaging said chain belt.*

* * * * *